United States Patent
Sen et al.

(10) Patent No.: US 11,897,772 B2
(45) Date of Patent: Feb. 13, 2024

(54) METHOD OF PREPARATION OF REDUCED GRAPHENE OXIDE(RGO)

(71) Applicants: TATA STEEL LIMITED, Jamshedpur (IN); CENTRE FOR NANO AND SOFT MATTER SCIENCES, Bangalore (IN)

(72) Inventors: Anand Sen, Jamshedpur (IN); Sumitesh Das, Jamshedpur (IN); Shyam Kumar Choudhary, Jamshedpur (IN); Giridhar Udapi Rao Kulkarni, Bangalore (IN); Murali Gedda, Bangalore (IN); Rajashekhar Ningappa Pujar, Bangalore (IN)

(73) Assignees: TATA STEEL LIMITED, Jamshedpur (IN); CENTRE FOR NANO AND SOFT MATTER SCIENCES, Bangalore (IN)

( * ) Notice: Subject to any disclaimer, the term of this patent is extended or adjusted under 35 U.S.C. 154(b) by 640 days.

(21) Appl. No.: 17/056,967

(22) PCT Filed: May 22, 2019

(86) PCT No.: PCT/IB2019/054213
§ 371 (c)(1),
(2) Date: Nov. 19, 2020

(87) PCT Pub. No.: WO2019/224730
PCT Pub. Date: Nov. 28, 2019

(65) Prior Publication Data
US 2021/0238042 A1   Aug. 5, 2021

(30) Foreign Application Priority Data
May 23, 2018  (IN) .............. 201831019387

(51) Int. Cl.
*C01B 32/198* (2017.01)

(52) U.S. Cl.
CPC ........ *C01B 32/198* (2017.08); *C01P 2006/12* (2013.01); *C01P 2006/40* (2013.01)

(58) Field of Classification Search
CPC ..... C01B 32/16; C01B 32/168; C01B 32/162; C01B 32/164; C01B 32/182;
(Continued)

(56) References Cited

U.S. PATENT DOCUMENTS

2010/0055458 A1* 3/2010 Jang .................. B82Y 40/00
977/755

FOREIGN PATENT DOCUMENTS

| EP | 2960274 A1 | 12/2015 |
| WO | 2013040636 A1 | 3/2013 |

OTHER PUBLICATIONS

Seo, et al., Value-added Synthesis of Graphene: Recycling Industrial Carbon Waste into Electrodes for High-Performance Electronic Devices, Scientific Reports 2015; 5: 16710, pp. 1-10 (Year: 2015).*
(Continued)

*Primary Examiner* — Daniel C. McCracken
(74) *Attorney, Agent, or Firm* — M&B IP Analysts, LLC (57) ABSTRACT

The present disclosure provides a simple and inexpensive method to produce reduced Graphene oxide (rGO). The method comprises conversion of low-cost carbon sources such as coal tar pitch (industrial by-product) into a high quality rGO wherein said conversion is carried out by annealing the carbon source at two different temperatures.
(Continued)

The rGO is obtained at high yields by employing the present method and the obtained rGO demonstrates high conductivity and good surface area along with very low oxygen content.

14 Claims, 4 Drawing Sheets

(58) Field of Classification Search
CPC ... C01B 32/184; C01B 32/186; C01B 32/188; C01B 32/19; C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; B01J 23/745; B01J 35/023; B01J 31/2295; B01J 2531/842; H01B 1/06; H01B 1/16; H01B 1/04; C01P 2004/04; C01P 2004/13; B82Y 30/00
See application file for complete search history.

(56) References Cited

OTHER PUBLICATIONS

Xu, et al., Facile preparation of graphene nanosheets by pyrolysis of coal-tar pitch with the presence of aluminum, Journal of Analytical and Applied Pyrolysis 2014; 110: 481-485 (Year: 2014).*

The International Search Report and The Written Opinion of the International Searching Authority for PCT/IB2019/054213, ISA/EPO, Rijswijk, The Netherlands, 2019.

Wang, et al., "Preparation of Fluffy Graphene Nanosheets from Coal-tar Pitch with Nano-Al2O3 as Filler," Journal of Analytical and Applied Pyrolysis, vol. 117, 2016, pp. 354-356.

Xu, et al., "Facile Preparation of Graphene Nanosheets by Pyrolysis of Coal-tar Pitch with the Presence of Aluminum," Journal of Analytical and Applied Pyrolysis, vol. 110, 2014, pp. 481-485.

* cited by examiner

METHOD OF PREPARATION OF REDUCED GRAPHENE OXIDE(RGO)

CROSS-REFERENCE TO RELATED APPLICATIONS

This application claims priority under 35 U.S.C. § 371 to the International Application No. PCT/IB2019/054213, filed May 22, 2019, and to the Indian Application No. 201831019387, filed May 23, 2018, now pending, the contents of which are hereby incorporated by reference.

TECHNICAL FIELD

The present disclosure is in the field of metallurgy and material sciences. The disclosure provides a simple and economical method to prepare reduced Graphene Oxide (rGO). In particular, the disclosure relates to a method of preparation of good quality rGO at high yield and throughput. Said method is eco-friendly and produces rGO having high conductivity and good surface area along with very low oxygen content.

BACKGROUND OF THE DISCLOSURE

Graphene oxide (GO) is a material with unique physical, conductive and permeation properties. Due to its unique properties, it has high potential applications in various fields of technology and research, such as semiconductor devices, gas-transport systems, sensors, mechanical resonators and the likes. It is also used in medical research for cancer treatment.

Reduced graphene oxide (rGO) is prepared by the reduction of graphene oxide by thermal, chemical or electrochemical treatments and it is found to have enhanced properties than that of graphene oxide. The method/route of preparation of reduced graphene oxide is important since it has a high impact on the quality of the rGO produced. There are various methods of preparation of rGO, but large-scale preparation of high quality rGO is one of the biggest challenges faced in this field. In particular, the currently employed chemical, thermal or electrochemical means of rGO production are complex and/or time consuming which limit their large-scale employment. Moreover, the rGO produced has often resulted in relatively poor yields in terms of surface area and electronic conductibility. Additionally, said methods are not eco-friendly and lead to environmental pollution due to the usage of hazardous gases, especially the chemical treatment based methods. Another major disadvantage in chemical reduction method is that the remnant chemicals in the final product makes the rGO impure and the quality of rGO is affected.

Considering the significance of rGO in various fields of technology and research, preparation of rGO in an economical and eco-friendly manner which can be used in various materials/applications is the need of the hour. Additionally, the methods should give good yields of rGO based on the employed carbon source/reactants in addition to the good mechanical/electrical properties. The present disclosure tries to address the aforesaid limitations and aims to achieve the present needs.

SUMMARY OF THE DISCLOSURE

The present disclosure provides a simple, cost effective, eco-friendly and high yielding method of preparation of reduced Graphene Oxide (rGO) from carbon source such as coal tar pitch (an industrial by-product).

In particular, the present disclosure provides a method of preparation of rGO comprising acts of: a) heating a carbon source at temperature ranging from 480° C. to 520° C., b) cooling the heated carbon source to a temperature ranging from 20° C. to 30° C., and c) heating the cooled carbon source under vacuum at a temperature ranging from 850° C. to 950° C., to obtain the rGO.

DETAILED DESCRIPTION OF THE DISCLOSURE

The present disclosure relates to a method of preparing reduced Graphene Oxide (rGO) comprising:
a) heating a carbon source at temperature ranging from about 480° C. to 520° C.;
b) cooling the heated carbon source; and
c) heating the cooled carbon source under vacuum at temperature ranging from about 850° C. to 950° C., to obtain the rGO.

In an embodiment of the present disclosure, the carbon source in the present method is coal tar pitch.

In another embodiment of the present disclosure, the carbon source in step a) of the present method is heated preferably at the temperature range of about 490° C. to 510° C.

In another embodiment of the present disclosure, the heating in step a) of the present method is carried out for a time-period ranging from about 60 minutes to 75 minutes.

In yet another embodiment of the present disclosure, the heated carbon source in step b) of the present method is cooled to a temperature range of about 20° C. to 30° C.

In still another embodiment of the present disclosure, the cooled carbon source in step c) of the present method is heated preferably at the temperature range of about 880° C. to 900° C.

In still another embodiment of the present disclosure, the heating in step c) of the present method is carried out for a time-period ranging from about 15 minutes to 30 minutes.

In still another embodiment of the present disclosure, the vacuum in step c) of the present method ranges from about $1\times10^{-1}$ to $1\times10^{-2}$ millibar.

In still another embodiment of the present disclosure, the rGO obtained by the present method has a conductivity ranging from about 1900 S/cm to 2100 S/cm, preferably 2000 S/cm.

In still another embodiment of the present disclosure, the rGO obtained by the present method has a surface area ranging from about 45 $m^2\ g^{-1}$ to 55 $m^2\ g^{-1}$, preferably about 50 $m^2\ g^{-1}$.

In still another embodiment of the present disclosure, the yield of rGO ranges from about 85% to 95% with respect to the carbon source.

In still another embodiment of the present disclosure, the coal tar pitch employed in the present method has a softening temperature of about 80° C. to 110° C., ash content of about 0 to 0.4%, quinoline insoluble (QI) of about 3% to 16%, toluene insoluble (TI) of about 16% to 22%, and a moisture content of about 0 to 0.5%.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The use of the expression "at least" or "at least one" suggests the use of one or more elements or ingredients or quantities, as the use may be in the embodiment of the disclosure to achieve one or more of the desired objects or results. Throughout this specification, the word "comprise", or variations such as "comprises" or "comprising" or "containing" wherever used, will be understood to imply the inclusion of a stated element, integer or step, or group of elements, integers or steps, but not the exclusion of any other element, integer or step, or group of elements, integers or steps. Further, unless defined otherwise, all technical and scientific terms used herein have the same meanings as commonly understood by person skilled in the art.

The present disclosure tries to overcome the limitations/shortcomings of the current processes known for producing reduced graphene oxide. The primary aim of the present disclosure is to provide an economical method for preparation of high quality reduced Graphene Oxide (rGO) by heating inexpensive carbon source such as coal tar pitch. In particular, one of the objectives of the present disclosure is to prepare high quality rGO in a simple, economical and environmental friendly manner with good yields, surface area and electronic conductibility.

To meet the aforesaid objectives, the present invention provides a method of preparing graphene oxide (rGO) comprising two-stage heating of a carbon source at two different temperatures.

In particular, the method of preparation of graphene oxide (rGO) comprises acts of:
a) heating a carbon source at a temperature ranging from about 480° C. to 520° C.;
b) cooling the heated carbon source; and
c) heating the cooled carbon source under vacuum at a temperature ranging from about 850° C. to 950° C. to obtain the graphene oxide (rGO).

In an embodiment of the present disclosure, the carbon source employed in the present method of preparation of rGO is coal tar pitch.

As used herein, coal tar pitch is a thick dark liquid present in coal tar, an industrial by-product of the production of coke. Said coal tar pitch can be distilled from the coal tar and predominantly comprises a complex mixture of aromatic compounds. In a preferred embodiment of the present disclosure, coal tar pitch obtained as an industrial by-product of steel production is employed for rGO preparation.

In an exemplary embodiment of the present disclosure, graphite grade coal tar pitch is employed for the preparation of rGO. In a preferred embodiment, the coal tar pitch employed in the present disclosure has properties as depicted in Table 1 below:

TABLE 1

| Properties of Coal tar pitch | | |
| --- | --- | --- |
| Property | Unit | Specification |
| Soften Point | ° C. | 104 |
| Toluene Insoluble (TI) | % | 22 |
| Quinoline Insoluble (QI) | % | 10-16 |
| Coking Value | % | minimum 53 |
| Ash | % | maximum 0.4 |
| Beta Resin | % | minimum 20-24 |
| Viscosity at 160° C. | cPs | 2000 |
| Specific Gravity at 27° C. | g/cm$^3$ | 1.3 |

In an exemplary embodiment of the present disclosure, coal tar pitch having a softening temperature of 104° C., ash content of 0.3% and a moisture content of 0.5% is employed as a carbon source for the preparation of rGO.

In an embodiment of the rGO preparation method described above, the carbon source in step a) is heated at a temperature range of about 490° C. to 510° C.

In a preferred embodiment of the rGO preparation method described above, the carbon source in step a) is heated at a temperature of about 500° C.

In an embodiment of the rGO preparation method described above, the carbon source in step a) is heated in a tube furnace.

In another embodiment of the rGO preparation method described above, the step b) comprises cooling the heated carbon source to a temperature ranging from about 20° C. to 30° C.

In a preferred embodiment of the present method, the cooling of heated carbon source in step b) is carried out at a temperature of about 25° C.

In yet another embodiment of the rGO preparation method described above, the cooled carbon source is heated in step c) at a temperature range of about 900° C. to 950° C.

In a preferred embodiment of the present method, the cooled carbon source is heated in step c) at a temperature of about 900° C.

In an embodiment of the rGO preparation method described above, the cooled carbon source in step c) is heated in a vacuum furnace.

The present method of preparing high quality rGO results in good yield along with properties including good surface area and conductibility of the produced rGO.

In an embodiment of the present disclosure, the rGO obtained by the present method has a conductivity ranging from about 1900 S/cm to 2100 S/cm.

In an exemplary embodiment of the present disclosure, the rGO obtained by the present method has a conductivity of about 2000 S/cm.

In another embodiment of the present disclosure, the rGO prepared by the present method has a surface area ranging from about 45 $m^2 g^{-1}$ to 55 $m^2 g^{-1}$.

In an exemplary embodiment of the present disclosure, the rGO obtained by the present method has a surface area of about 50 $m^2 g^{-1}$.

In still another embodiment of the present method, the rGO is obtained at a yield ranging from about 85% to 95% with respect to the carbon source.

The present disclosure therefore provides an inexpensive and ecofriendly route/method to prepare reduced Graphene Oxide (rGO) involving heating a carbon source at different temperatures, wherein said method is devoid of expensive instrumentation or any gaseous sources including hydrogen. Said method of preparation provided by the present disclosure can potentially be extended to bulk synthesis with higher throughputs. The quality of rGO obtained by the present method is shown by the good conductivity and surface area which also confirms it's potential in wide range of applications including energy storage devices.

In the method of preparation of rGO in the present invention, a low cost source such as coal tar pitch is preferably employed as a carbon source. The conversion of coal tar pitch to rGO is achieved by heating the carbon source at two different temperatures as described above.

In an exemplary embodiment of the present disclosure, the process of rGO preparation involves heating in two stages, wherein initially the solid coal tar pitch is powdered and heated at a temperature ranging from 480° C. to 520° C., preferably at 500° C. and maintained for about 1 hour to evaporate solvents with a boiling point around of 500° C., such as toluene, benzene, xylene, dimethyl naphthalene and the likes. Thereafter, the temperature of the heated material is brought down to about 25° C. to 30° C. (cooling) and later heated again in a vacuum furnace at temperature ranging from 850° C. to about 950° C., preferably at 900° C. for about 15 minutes to 30 minutes to obtain the rGO. The rGO thus obtained is further collected at a temperature of about 25° C. and examined for its characteristics by employing various characterization techniques.

In an embodiment of the present disclosure, the rGO prepared by the present method is characterized to analyze the physical, structural and electrical properties using Raman Spectroscopy, X-Ray diffraction (XRD) analysis, X-ray photoelectron spectroscopy (XPS) analysis, Scanning Electron Microscopy (SEM)—Energy-dispersive X-ray spectroscopy (EDX), Conductivity analysis and BET-surface area analysis.

The present disclosure further provides reduced graphene oxide (rGO) obtained by the method described herein. Said rGO is of high quality including good conductance and surface area, and can be used in wide range of applications including electronics, energy storage and biomedical/biosensor applications.

In an embodiment, the foregoing descriptive matter is illustrative of the disclosure and not a limitation. While considerable emphasis has been placed herein on the particular features of this disclosure, it will be appreciated that various modifications can be made, and that many changes can be made in the preferred embodiments without departing from the principles of the disclosure. Those skilled in the art will recognize that the embodiments herein can be practiced with modification within the spirit and scope of the embodiments as described herein.

EXAMPLES

Example 1: Preparation of Reduced Graphene Oxide (rGO)

The method of the present invention and various comparative experiments, including rapid heat treatment, heating with various hot gases and moderate to very high temperature heat treatment of carbon source (coal tar pitch) are performed to achieve rGO. The said experiments are explained below.

According to the method of the present invention, 50 grams of coal tar pitch is powdered and heated in a tube furnace, particularly in a ceramic boat on a hot plate set at a temperature of 500° C. for 1 hour. After heating for 1 hour, the coal tar pitch is cooled to a temperature of about 25° C. and then transferred to a vacuum furnace followed by heating to a temperature of 900° C. under rotary vacuum for 15 minutes to obtain rGO. The coal tar pitch converted into rGO with an yield of 90% is thereafter cooled and collected at about 25° C.

Figure 7:
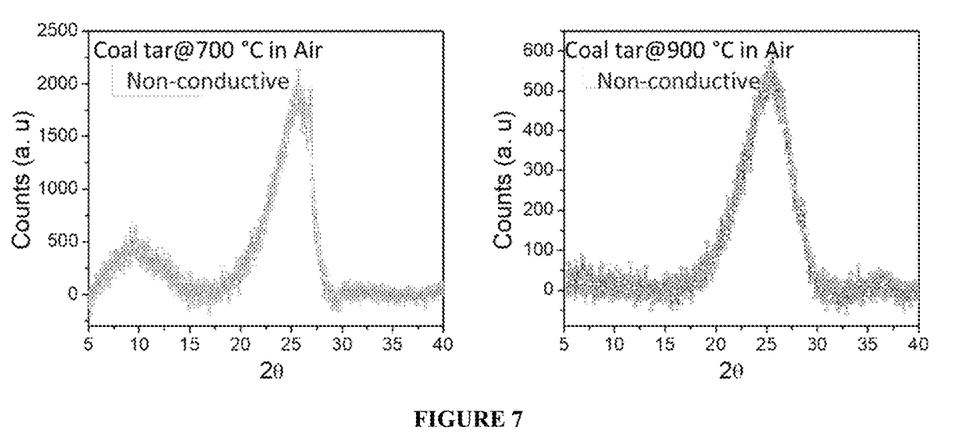
FIG. 7 depicts the XRD profile of the samples prepared by heating the coal-tar filled crucible under ambient air between 700° C. and 900° C. The sample was pre-heated in ambient air for 1 hour at 500° C. Though there is a significant reduction in GO phase, but the material obtained in this process is non-conductive.

Comparative Example A: External Heating Method in the Presence of Air 50 grams of coal tar pitch was heated in a first heating cycle at 500° C. for 1 hour. Thereafter, external heating under air is carried out using a tube furnace wherein the coal-tar pitch filled crucible is heated under ambient air between 700° C. and 900° C. XRD profile of the samples prepared this by method is provided in FIG. 7. Though there is a significant reduction in GO phase, the material obtained by this method is non-conductive.

Figure 8:
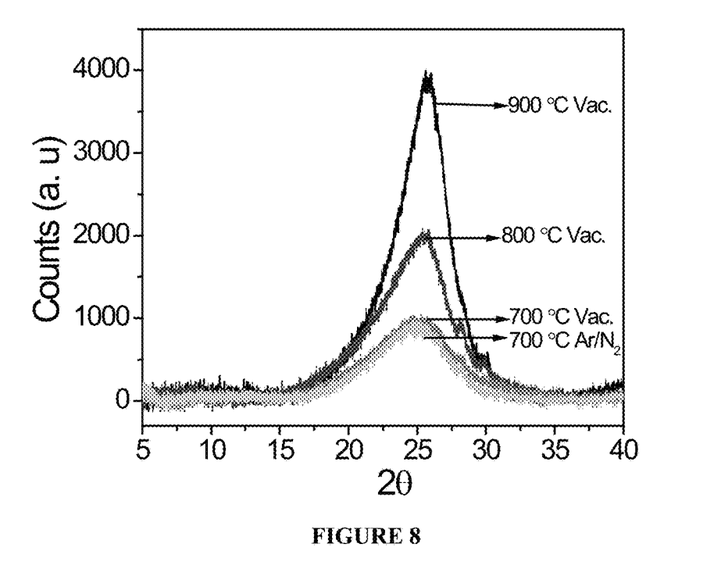
FIG. 8 depicts XRD profile of the samples prepared by heating the coal-tar pitch under vacuum at 700° C., 800° C., 900° C. and by supplying heat under $Ar/N_2$ at 700° C.

Comparative Example B: External Heating Method in the Presence of Ar/$N_2$ or Vacuum 100 ml of coal tar was first heated at a temperature of 500° C. for 1 hour. In one method, external heating was thereafter carried out under $N_2$/Ar atmosphere wherein the coal tar was heated under said $N_2$/Ar atmosphere at 900° C. In another method, external heating under vacuum is carried out at temperatures 700° C., 800° C. and 900° C. XRD profile of the samples prepared by this method is provided in FIG. 8.

Comparative Example C: Joule Heating Method Under Vacuum

In this method, joule heating is carried out by coating the coal tar on both Ni and Al substrates followed by joule heating at 700° C.

The employed process steps/parameters of the above methods and corresponding conductivity results are tabulated in Table 2 below (Example 2).

Example 2: Analysis of Physical, Structural and Electrical Properties

Figure 1:
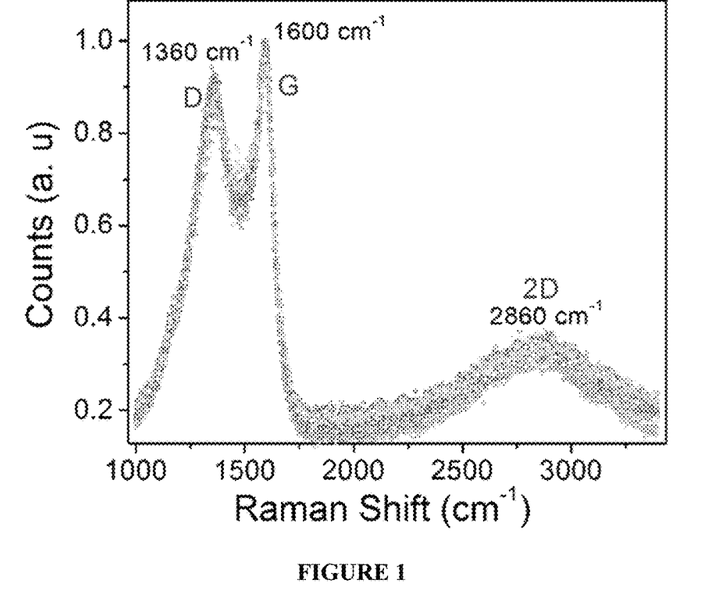
FIG. 1 depicts Raman Spectroscopy analyses of rGO sample obtained by the method of present disclosure. The high $I_D/I_G$ values along with prominent 2D peak at 2860 $cm^{-1}$ is due to the increase in the number of $sp^2$ clusters, confirming that coal tar pitch is successfully converted to rGO.

Specimens for analyzing structural, physical and electrical properties were taken from the rGO prepared by the present method as described in Example 1. Additionally, electrical properties (conductance) was also analyzed to understand the criticality of the method steps of the present invention and superiority of the rGO produced by said method versus other comparative methods/conditions described in Example 2. The characterization studies and results are described below.

a) Raman Spectroscopy:

Raman spectroscopy was employed to characterize the structural properties of rGO obtained by the method of the present disclosure. FIG. 1 shows the Raman spectroscopy analyses of rGO sample at various locations.

In Raman spectra, the rGO formation is analysed by the significant characteristics peaks shifts of two main D and G peaks. As shown in FIG. 1, D and G peaks of rGO are located at 1,360 cm$^{-1}$ and at 1,600 cm$^{-1}$ respectively, indicating a defect-induced breathing mode of sp$^2$ rings common to an sp$^2$-bonded carbon lattice, which originates from the stretching of C—C bonds. The intensity of the D band is related to the size of the in-plane sp$^2$ domains, and the increase in D peak intensity indicates the formation of additional sp$^2$ domains. The intensity ratio of the two peaks ($I_D/I_G$) is a measure of disorder degree and is inversely proportional to the average size of the sp$^2$ clusters. The high $I_D/I_G$ values along with prominent 2D peak at 2860 cm$^{-1}$ in the sample is due to the increase in the number of sp$^2$ clusters, confirming that coal tar pitch is successfully converted to rGO.

b) XRD Analysis

Figure 2:
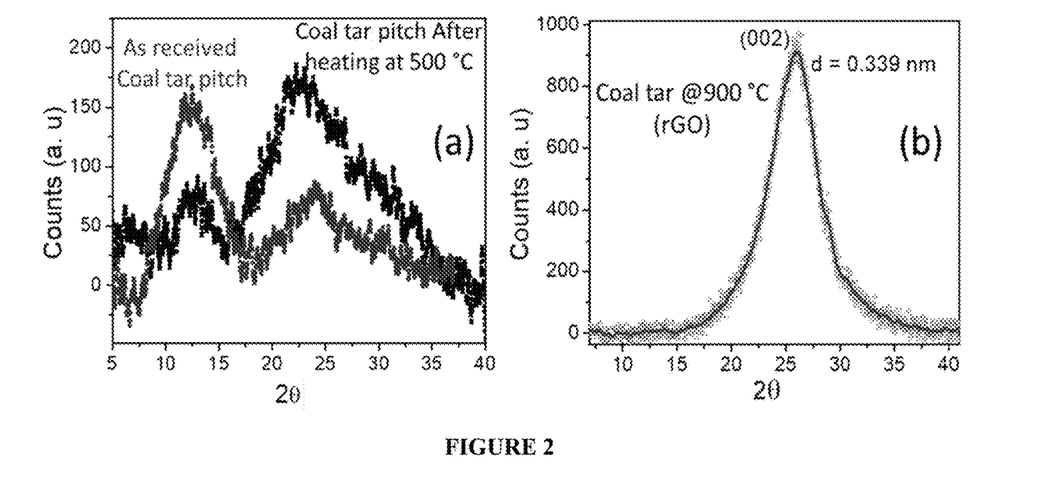
FIG. 2 depicts XRD patterns of (a) as received coal tar pitch and after 500° C. heat treatment for 1 hour and (b) rGO (coal tar pitch at 500° C.). This analysis confirms the good rGO phase formation with low d-spacing at 900° C.

The crystallographic phase of rGO obtained by the present method is examined by XRD. FIG. 2 provides XRD patterns of as received coal tar pitch and after 500° C. heat treatment for 1 hour [FIG. 2(a)], and FIG. 2(b) provides that of rGO.

Usually, for GO, a strong diffraction peak appear at 2θ=~10°. Significant peak corresponding to GO is observed in coal tar pitch and after 500° C. heat treatment [FIG. 2(a)]. However, this peak completely disappeared for coal tar pitch converted rGO, and a new peak at 2θ=~26° with d-spacing 0.339 nm appears due to graphene diffraction (FIG. 2b). Thus, it is concluded that coal tar pitch is effectively converted into rGO. Interestingly, there are no obvious diffraction peaks of graphene observed in rGO profile, indicating that graphene sheets are homogeneously dispersed. This analysis confirms the good rGO phase formation with low d-spacing at 900° C. and the samples below this temperature, preferably below 850° C., does not have clear rGO phase which indicates that heating between 850° C. to 950° C., preferably at 900° C. is necessary for the formation of rGO.

c) XPS Analysis

Figure 3:
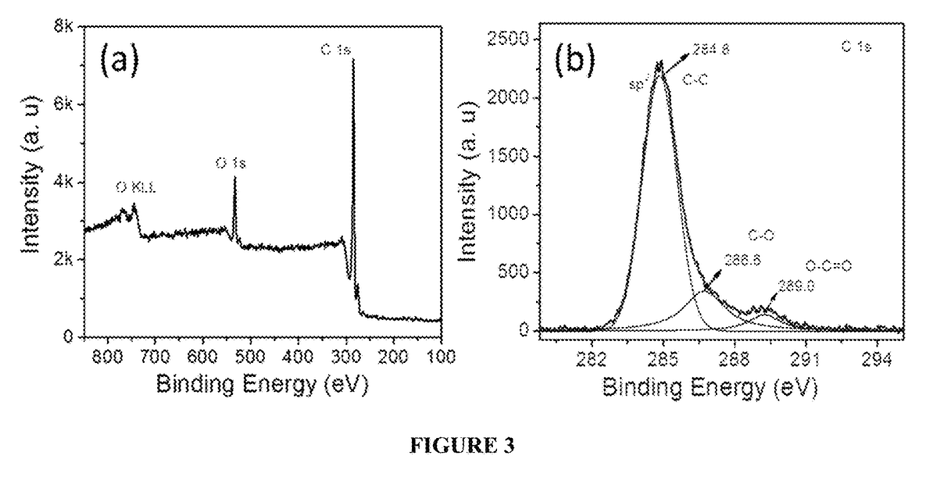
FIG. 3 depicts XPS spectra of (a) The wide scan spectrum of rGO, (b) core level C1s XPS spectra. The XPS peak intensities of oxygen-containing functional groups of rGO obtained from deconvolution spectra are relatively low, indicating that a considerable amount of functional groups in coal tar pitch have been reduced.

XPS spectra of the rGO obtained by the present method is measured. The wide scan XPS spectrum of GO is shown in FIG. 3(a). The C1s core level high resolution spectra show three components that correspond to carbon atoms in different functional groups [FIG. 3(b)]. The non-oxygenated ring C—C appears at 284.8 eV, the C in C—OH bonds at 286.6 eV, and the carboxylate carbon (HO—C═O) at 289.0 eV. Then the core level high resolution C1s XPS spectra also indicates a considerable degree of reduction in oxygen functionalities. The XPS peak intensities of oxygen-containing functional groups of rGO obtained from deconvolution spectra are relatively low, indicating that a considerable amount of functional groups in coal tar pitch have been reduced and confirms rGO formation with very low oxygen in it.

d) SEM-EDX Analysis

Figure 4:
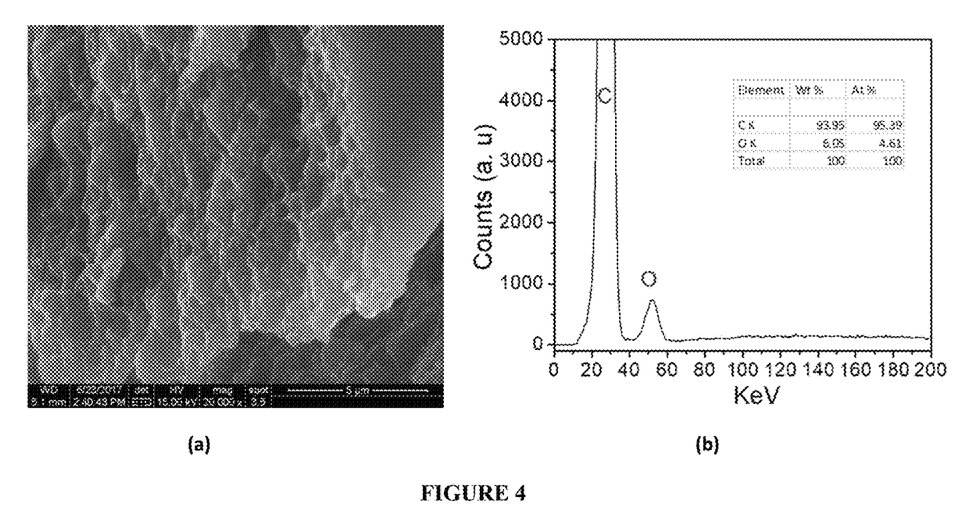
FIG. 4 depicts (a) FE-SEM image of rGO synthesized from coal tar pitch according to the method of the present disclosure. A randomly aggregated, thin, crumpled graphene sheets with wavy structures can be observed, (b) the EDX spectra confirms the presence of carbon and oxygen in rGO.

FIG. 4(a) shows the FE-SEM image of rGO synthesized from coal tar pitch according to the method of the present disclosure. A randomly aggregated, thin, crumpled graphene sheets with wavy structures can be observed in the same figure. The EDX spectra shown in FIG. 4(b) also confirms the presence of carbon and oxygen in rGO. Majority of oxygen-containing functional groups are removed from rGO sheets, and the atomic ratio of carbon to oxygen is 4.61. This analysis confirms the formation of high purity rGO with excellent layered structure.

e) Analysis of Conductivity

Figure 5:
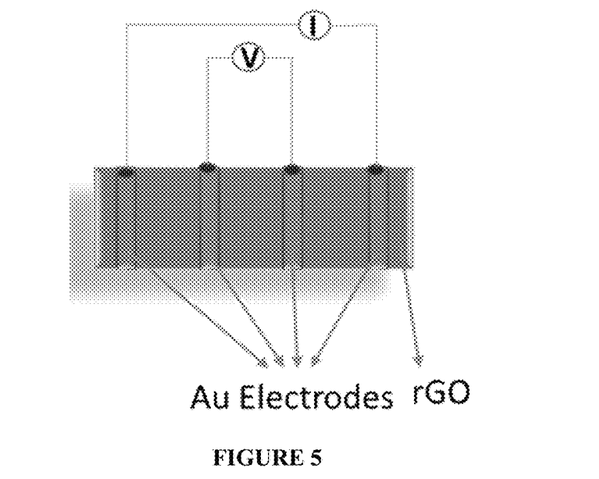
FIG. 5 depicts schematic representation of 4-probe experimental method employed for analyzing electrical conductivity. Four Au electrodes are deposited across the rGO flake.

In order to quantify the electrical properties of the rGO obtained according to the method of the present disclosure, conductivity was estimated with the in-line 4-probe experimental set up as illustrated in FIG. 5. The estimated electrical conductivity is as high as about 2000 S/cm. The rGO sample obtained by treating the cooled coal tar pitch in rotary vacuum at 900° C. for 15 minutes was used for the analysis.

f) BET-Surface Area Analysis

Figure 6:
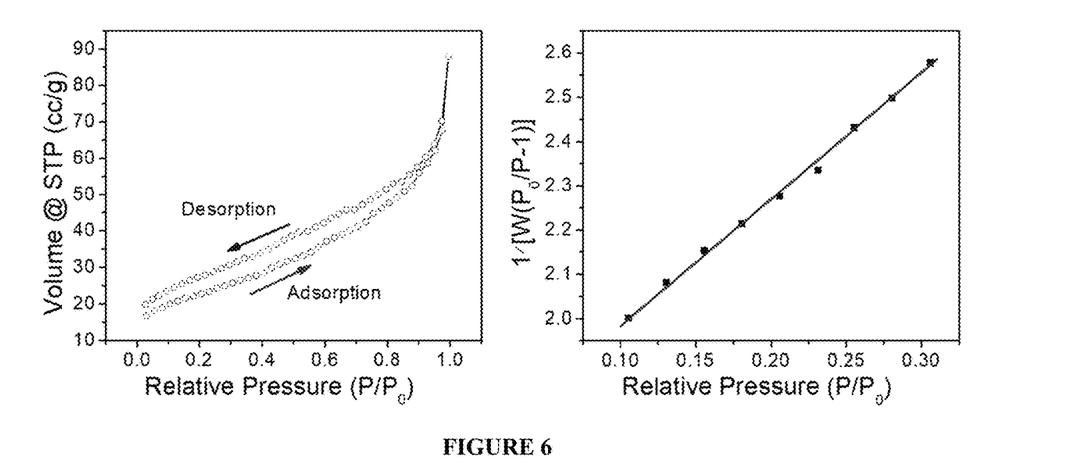
FIG. 6 depicts BET surface area analysis—volume ($cm^3$ $g^{-1}$) of adsorbed isotherm for the rGO. The available surface area of the sample is estimated by $N_2$ adsorption-desorption behavior.

FIG. 6 shows the BET isotherm of the rGO sample employed for the BET surface area analysis—Volume (cm$^3$ g$^{-1}$) of adsorbed isotherm for the rGO is shown. The available surface area of the sample is estimated by N$_2$ adsorption-desorption behavior. Due to the mesoporous nature of the sample, a large quantity is adsorbed on the surface. The surface area for the rGO material is found to be 50 m$^2$ g$^{-1}$. The sample employed for the analysis is obtained based on the method of Example 2 (Comparative Example B), however the method of the present invention was followed wherein coal-tar pitch was used here instead of coal-tar and the sample was obtained by treating the coal-tar pitch in rotary vacuum at 900° C. for 15 minutes.

Analysis of electrical and physical properties show that the conductivity of rGO prepared from coal-tar pitch according to the method of the present invention is as high as 2000 S/cm and the sheet resistance extracted from 4-probe measurement is as low as 3 Ω/sq. The surface area estimated with the help of BET surface area analyzer indicates a surface area of ~50 m$^2$/g, and the electrochemical surface area is expected to be much higher.

Additionally, electrical properties (conductance) of the rGO produced by the present method versus other comparative methods/conditions described in Example 1 were studied. The results are provided in Table 2.

To measure the conductance, sheet resistance ($R_S$) was initially estimated for the rGO flakes of size 3×3 to 4×4 mm$^2$. The thickness of the rGO flake was about 5-8 μm. Resistivity of the rGO has been estimated by using the formula, $\rho = t \ast R_S$, where t is the thickness of the rGO fakes. Conductance=1/ρ S/cm.

TABLE 2

Comparative analysis of rGO obtained by different method/conditions Conductance of rGO obtained under different method conditions

| Method used | Temperature (° C.) | Environment | Nature of Material | Conductance [Siemen per centimeter (S/cm)] |
|---|---|---|---|---|
| External Heating (comparative example A) | 700-900 | Air | Graphene oxide (GO) like | Non-conducting |
| External Heating (comparative example B) | 900 | Ar & $N_2$ | Partially reduced GO | 0.08-0.15 |
| External Heating (comparative example B) | 700 | Vacuum | rGO | 3.50-5.30 |
| External Heating (comparative example B) | 800 | Vacuum | rGO | 30.50-34.55 |
| External Heating (present method) | 900 | Vacuum | rGO | 1900-2100 |
| Joule Heating on Al | 700 | Vacuum | GO & rGO | 0.02-0.05 |
| Joule Heating on Ni | 700 | Vacuum | GO & rGO | 0.85-1.10 |

As observed from the above experimental results, the rGO prepared by the present method steps/conditions (especially the employment of defined temperature ranges and the presence of vacuum for external heating/$2^{nd}$ heat treatment) is of high quality having a good conductance and surface area. Further, though the rGO obtained by different comparative methods/conditions showed rGO phase, the quality of rGO was not desirable. In particular, among all experiments, external heating/$2^{nd}$ heat treatment step of coal tar pitch under vacuum at 900° C. (present method) gave the highest conductivity. The results also show that the temperature range of 850° C.-950° C., preferably 900° C. and the vacuum atmosphere is critical to achieve high quality rGO at high yields. Further, the present method is not only economical/inexpensive, but also has the advantage of high throughput and the present process conditions can be employed for bulk production of rGO.

The present invention thus successfully provides an inexpensive and eco-friendly route for preparation of good quality and high yield rGO from carbon source, preferably coal tar pitch which is an industrial by product. The quality of the rGO obtained and the throughput achieved by the present method would help in adoption of this method by various industries where rGO is used.

We claim:

1. A method of preparing reduced Graphene Oxide (rGO) comprising:
   a) heating a carbon source at temperature ranging from about 480° C. to 520° C.;
   b) cooling the heated carbon source; and
   c) heating the cooled carbon source under vacuum at temperature ranging from about 850° C. to 950° C., to obtain the rGO.

2. The method as claimed in claim 1, wherein the carbon source is coal tar pitch.

3. The method as claimed in claim 2, wherein the coal tar pitch has a softening temperature of about 80° C. to 110° C., ash content of about 0 to 0.4%, quinoline insoluble (QI) of about 3% to 16%, toluene insoluble (TI) of about 16% to 22% and a moisture content of about 0 to 0.5%.

4. The method as claimed in claim 1, wherein heating the carbon source in step a) is performed at the temperature of about 490° C. to 510° C.

5. The method as claimed in claim 1, wherein the heating in step a) is carried out for a time-period ranging from about 60 minutes to 75 minutes.

6. The method as claimed in claim 1, wherein the heated carbon source in step b) is cooled to a temperature range of about 20° C. to 30° C.

7. The method as claimed in claim 1, wherein heating the cooled carbon source in step c) is performed at the temperature of about 880° C. to 900° C.

8. The method as claimed in claim 1, wherein the heating in step c) is carried out for a time-period ranging from about 15 minutes to 30 minutes.

9. The method as claimed in claim 1, wherein the vacuum in step c) ranges from about $1 \times 10^{-1}$ to $1 \times 10^{-2}$ millibar.

10. The method as claimed in claim 1, wherein the prepared rGO has a conductivity ranging from about 1900 S/cm to 2100 S/cm.

11. The method as claimed in claim 1, wherein the rGO has a surface area ranging from about 45 $m^2 g^{-1}$ to 55 $m^2 g^{-1}$.

12. The method as claimed in claim 1, wherein a yield of rGO ranges from about 85% to 95% with respect to the carbon source.

13. The method as claimed in claim 1, wherein the prepared rGO has a conductivity of 2000 S/cm.

14. The method as claimed in claim 1, wherein the rGO has a surface area of about 50 $m^2 g^{-1}$.

* * * * *